No. 615,963. Patented Dec. 13, 1898.
M. B. DRINKWALTER.
APPARATUS FOR SPRAYING INSECTICIDE SOLUTIONS.
(Application filed June 16, 1898.)
(No Model.)
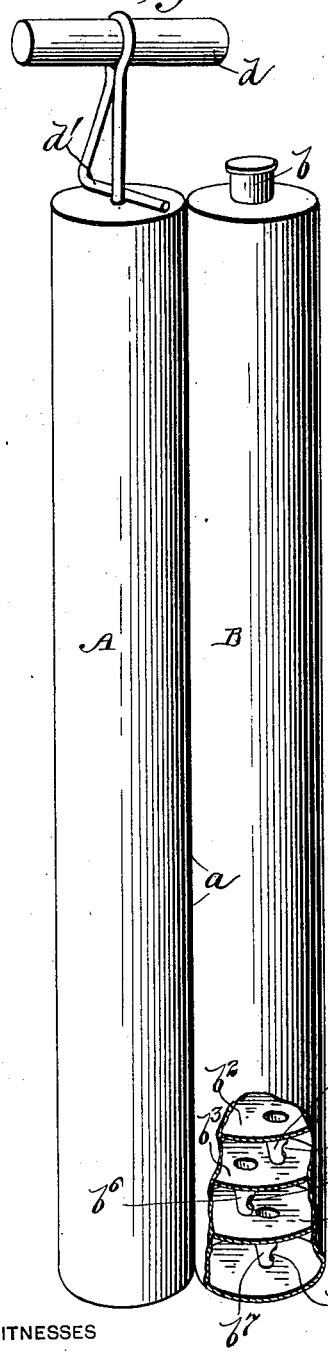
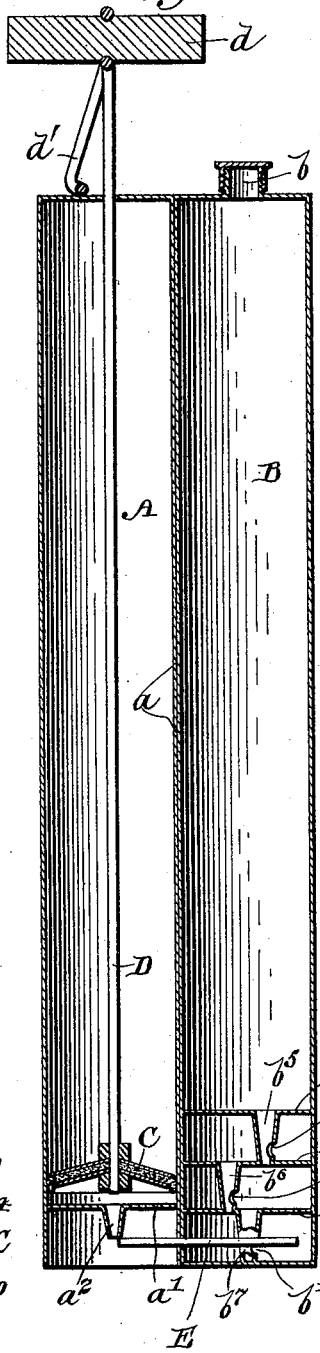
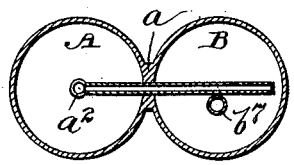
WITNESSES
INVENTOR

United States Patent Office.

MILES B. DRINKWALTER, OF WILSON, NEW YORK, ASSIGNOR TO STEPHEN H. MORRIS, OF NIAGARA FALLS, NEW YORK.

APPARATUS FOR SPRAYING INSECTICIDE SOLUTIONS.

SPECIFICATION forming part of Letters Patent No. 615,963, dated December 13, 1898.

Application filed June 16, 1898. Serial No. 683,544. (No model.)

*To all whom it may concern:*

Be it known that I, MILES B. DRINKWALTER, a citizen of the United States, residing in the town of Wilson, in the county of Niagara and State of New York, have invented certain new and useful Improvements in Apparatus for Spraying Insecticide Solutions; and I do hereby declare the following to be a full, clear, and exact description of the invention, such as will enable others skilled in the art to which it appertains to make and use the same.

My invention relates to an apparatus designed especially for spraying vegetables and plants of all kinds with a solution designed to destroy noxious insects; and it consists in providing novel means by which the too free flow of the liquid to be sprayed is retarded and will not escape except when the apparatus is operated, and by which means the liquid can be sprayed as readily in an upward direction as in a downward direction and by which other important advantages are secured, as will be hereinafter described and specifically claimed.

In the accompanying drawings, Figure 1 is a perspective view of my improved spraying apparatus, a portion of the liquid-chamber where the retarding-partitions are located being broken away to exhibit said partitions. Fig. 2 is a vertical longitudinal section through the same, and Fig. 3 is a section taken on the line C D in Fig. 2.

A in the drawings represents the air-chamber, and B the liquid-chamber. These chambers are cylindrical in shape and of preferably the same size and length and are preferably rigidly secured together, as at $a$. The air-cylinder A is provided with a piston C and a piston-rod D of ordinary construction, the latter being provided with a suitable handle $d$ for operating the piston back and forth. The upper end of the piston-rod is bent around the handle $d$ and extended forward of said handle to form a stop $d'$, by the use of which the hand of the operator is prevented from coming in contact with the body of the apparatus and being injured. The air chamber or cylinder is closed near its forward end by a diaphragm or bottom $a'$, in which is secured an air-nozzle $a^2$. The diaphragm or bottom $a'$ is located slightly in rear of the extreme outer edge of the air-cylinder, by which construction the air-nozzle is prevented from being clogged with dirt and being accidentally broken off. As heretofore stated, the liquid chamber or cylinder B is practically the same shape and size as the air chamber or cylinder and is provided at or near its inner end with an opening $b$, provided with a suitable cap, for the introduction of the insecticide solution to be sprayed onto the plants. At the forward end of the solution chamber or cylinder are provided auxiliary chambers formed by a series of partitions $b^2 b^3 b^4$, which latter are connected by open-ended tubes $b^5 b^6 b^7$. These tubes are arranged out of a vertical line with each other, and each is formed with an opening $b^8 b^9 b^{10}$, which latter are located in the sides of the tubes, near the forward ends of the same. The spaces between the partitions $b^2 b^3 b^4$ communicate one with the other through the tubes, and the innermost space or compartment communicates with the main reservoir. A tube E extends into the most forward space or compartment, with its end above the level of the opening $b^{10}$, the tube extending out from said compartment to a point directly over the outer end of the air-nozzle $a^2$. By this construction and arrangement when the main reservoir is filled with solution it will pass into the compartments through the tubes and fill the compartments up to the level of the openings $b^8 b^9 b^{10}$ and seal the same with solution. When the piston is pushed in, the force of air caused to pass out at the air-nozzle $a^2$ and across the end of the tube E will draw the fluid through said tube and discharge it in the direction of the passage of the air, whereupon the fluid which is drawn out from the outermost compartment will be replaced by the fluid from the adjoining compartment, and so on, so that a continuous and automatic flow of the solution is maintained, and this can be kept up as long as desired or until the entire quantity of solution has been sprayed.

From the foregoing it will be seen that some of the solution is constantly retained in the auxiliary chambers, which serves as a primer to siphon the solution from an adjoining chamber and from the main reservoir when the piston is operated. I regard this as an important feature of my invention, and it will be found particularly useful when the apparatus is used for spraying in an upward direction, as it greatly facilitates the feed of the solution and enables a continuous and even spray to be maintained.

Having now described my invention, what I claim as new, and desire to secure by Letters Patent, is—

1. In an apparatus for spraying insecticide solution, the combination of an air-chamber and a solution-chamber, a piston suitably operating in said air-chamber, an air-nozzle at the forward end of the said air-chamber, partitions at the forward end of the solution-chamber forming auxiliary compartments, open-ended tubes connecting said partitions, apertures in the sides of the tubes, a solution-pipe communicating with one of the compartments and extending to a point in line with the air-nozzle, and means for filling the solution-chamber, substantially as described.

2. In an apparatus for spraying insecticide solution, the combination of an air-cylinder which is closed at its forward end by a bottom which terminates in the rear of the outer end of said cylinder, an air-nozzle passing through said bottom, a pump for forcing air through the nozzle, a solution-chamber secured to the air-chamber and provided with means for filling the same, auxiliary compartments at the forward end of the solution-chamber which are formed by a series of partitions, open-ended tubes connecting the partitions, apertures in the tubes near their forward ends, and a tube communicating with one of the compartments and extending to a point in line with the air-nozzle, substantially as described.

3. In an apparatus for spraying insecticide solution, the combination of an air-chamber and a solution-chamber, a bottom or diaphragm secured in the air-chamber in the rear of its forward end, an air-nozzle extended through said diaphragm, a piston operating in said air-chamber and connected to a piston-rod which latter is bent around a suitable handle to form a guard for the hand of the operator, partitions at the forward end of the solution-chamber forming auxiliary compartments, open-ended tubes connecting the said partitions and provided with apertures in their sides near their forward ends, a tube inserted into one of said compartments and extending to a point in line with the air-nozzle, the said solution-chamber being provided with an opening near its forward end for the introduction of the spraying solution, substantially as described.

In testimony whereof I hereunto affix my signature in presence of two witnesses.

MILES B. DRINKWALTER.

Witnesses:
FREDERICK M. BRIEN,
STEPHEN H. MORRIS.